(12) United States Patent
Nachem

(10) Patent No.: US 10,053,193 B2
(45) Date of Patent: Aug. 21, 2018

(54) WATERCRAFT DOCKING SYSTEMS AND METHODS OF THEIR OPERATION

(71) Applicant: Ira Nachem, Bridgeport, CT (US)

(72) Inventor: Ira Nachem, Bridgeport, CT (US)

(73) Assignee: Ira Nachem, Bridgeport, CT (US)

( * ) Notice: Subject to any disclaimer, the term of this patent is extended or adjusted under 35 U.S.C. 154(b) by 14 days.

(21) Appl. No.: 14/654,716

(22) PCT Filed: Jun. 26, 2014

(86) PCT No.: PCT/US2014/044373
§ 371 (c)(1),
(2) Date: Jun. 22, 2015

(87) PCT Pub. No.: WO2014/210332
PCT Pub. Date: Dec. 31, 2014

(65) Prior Publication Data
US 2016/0107727 A1    Apr. 21, 2016

Related U.S. Application Data

(60) Provisional application No. 61/840,035, filed on Jun. 27, 2013.

(51) Int. Cl.
*E02B 3/24* (2006.01)
*B63B 21/04* (2006.01)
(Continued)

(52) U.S. Cl.
CPC .............. *B63B 21/04* (2013.01); *B63B 43/18* (2013.01); *G05D 3/10* (2013.01); *B63B 2021/003* (2013.01); *B63B 2021/203* (2013.01)

(58) Field of Classification Search
CPC ... B63B 21/04; B63B 43/18; B63B 2021/003; B63B 2021/203; B63B 2021/004; G05D 3/10; G05D 2021/003; G05D 2021/203
(Continued)

(56) References Cited

U.S. PATENT DOCUMENTS 3,584,351 A * 6/1971 Sliwinski ............. A01D 43/063
24/600.7
3,646,645 A * 3/1972 Bauer ..................... B63B 21/08
24/600.5
(Continued)

FOREIGN PATENT DOCUMENTS

GB        1274124 A    5/1972
JP        S58136585 A  8/1983
(Continued)

OTHER PUBLICATIONS

Written Opinion received in corresponding PCT Application No. PCT/US2014/044373, dated Jan. 7, 2015, pp. 1-8.
(Continued)

*Primary Examiner* — Alan D Hutchinson

(57) ABSTRACT

A system for securing a watercraft to a dock includes a first sensor for automatically detecting a securing point to which to dock the watercraft, an extendable arm with a cable inside, the cable having a proximal end for mounting to the watercraft, and a grasping element mounted to a distal end of the cable and configured to reversibly engage the securing point. A method for securing a watercraft to a dock includes automatically detecting a securing point on the dock, extending an arm from the watercraft toward the securing point, wherein the arm houses a cable having a proximal end mounted to the watercraft, and reversibly engaging the securing point using a grasping element mounted to a distal end of the arm.

18 Claims, 10 Drawing Sheets

(51) Int. Cl.
  *B63B 43/18* (2006.01)
  *G05D 3/10* (2006.01)
  *B63B 21/20* (2006.01)
  *B63B 21/00* (2006.01)

(58) Field of Classification Search
  USPC ........ 701/21; 114/44, 230.17, 230.2, 230.25, 114/230.26, 230.28
  See application file for complete search history.

(56) References Cited

U.S. PATENT DOCUMENTS

| | | | | |
|---|---|---|---|---|
| 3,811,158 | A | * | 5/1974 | Merser ..................... B63H 9/10 114/114 |
| 4,677,930 | A | * | 7/1987 | Ortloff .................... B63B 21/60 114/230.14 |
| 4,719,773 | A | * | 1/1988 | Alberts ............... E05B 73/0005 70/18 |
| 4,729,332 | A | | 3/1988 | Ohta et al. |
| 4,932,700 | A | * | 6/1990 | Hart ........................... B25J 1/04 114/221 R |
| 5,003,437 | A | * | 3/1991 | Barrett ..................... F21L 11/00 114/221 R |
| 5,499,591 | A | * | 3/1996 | Chippas .................. B63B 21/00 114/218 |
| 5,537,299 | A | | 7/1996 | Perry |
| 6,145,461 | A | * | 11/2000 | VanAssche ............. B63B 21/00 114/230.1 |
| 6,962,122 | B1 | * | 11/2005 | Bouldin, Jr. ............ B63B 21/00 114/230.17 |
| 7,021,231 | B2 | * | 4/2006 | Smart ..................... B63B 21/00 114/230.17 |
| 7,712,804 | B2 | * | 5/2010 | Leyden ................... B63B 21/54 114/221 R |
| 2012/0080944 | A1 | * | 4/2012 | Recker ...................... H02J 9/02 307/25 |
| 2012/0129410 | A1 | | 5/2012 | Tyers |
| 2012/0145064 | A1 | | 6/2012 | Tureaud et al. |
| 2012/0152161 | A1 | * | 6/2012 | Stanley ................... B63B 21/54 114/230.1 |

FOREIGN PATENT DOCUMENTS

| | | | |
|---|---|---|---|
| WO | WO 9518038 A1 * | 7/1995 | ............. B63B 21/00 |
| WO | WO 2005/030571 A2 | 4/2005 | |

OTHER PUBLICATIONS

European Search Report received in corresponding EP Application No. 14818764.4, dated Nov. 7, 2016, pp. 1-12.
Australian Examination Report mailed in the corresponding AU Application No. 2014302350, dated May 3, 2017, 3 pages.
Examination report No. 2 for corresponding Australian Patent Application No. 2014302350 dated Aug. 24, 2017, 4 pages.
International Search Report and Written Opinion in corresponding PCT/US2014/044373, dated Nov. 5, 2014, 11 pages.

* cited by examiner

WATERCRAFT DOCKING SYSTEMS AND METHODS OF THEIR OPERATION

CROSS REFERENCE TO RELATED APPLICATIONS

This application claims the benefit of International Application No. PCT/US2014/044373, filed Jun. 26, 2014, which claims the benefit of U.S. Provisional Patent Application Ser. No. 61/840,035, filed Jun. 27, 2013, all of which are herein incorporated by reference in their entirety.

FIELD OF THE INVENTION

Generally, the present disclosure relates to watercraft docking. More particularly, the present disclosure relates to watercraft docking systems and methods of their operation.

BACKGROUND

In the present disclosure, where a document, act, or item of knowledge is referred to or discussed, this reference or discussion is not an admission that the document, act, or item of knowledge, or any combination thereof, was at the priority date, publicly available, known to the public, part of common general knowledge, or otherwise constitutes prior art under the applicable statutory provisions; or is known to be relevant to an attempt to solve any problem with which the present disclosure is concerned.

Boat ownership comes with many perks. One of such perks is being able to, get away, whenever one desires, from common distractions of daily life and enjoy time, alone at sea. Nevertheless, many boat owners, often with substantial investments of time and money in their boats, are unable to get away alone. One possible reason for such an occurrence is that the boat owners lack skills or express self-doubt in properly operating their boats alone, even if in good fitness and health. This also applies to captains, crewpersons, operators, pilots, helmsmen, sailors, professionals and amateurs and any other person that controls the vessel.

Proper boat operation has many aspects. One of such aspects is boat docking. Many boat owners can relate to a scenario where the boat can be ready for docking at a dock, but then due to winds, water movement or human adjustment, the boat moves away from the dock and delays docking. Such scenario becomes more acute when the boat owner experiences increased stress and anxiety level resulting from unfamiliarity with the dock or bad weather.

Moreover, many motor-powered boats, especially those over thirty feet long, have flybridges or vast interior living space, which reduces exterior space for walking around the boat. Due to such, these boats are typically difficult or in many cases impossible to dock without at least one other crewmember aboard or someone waiting for the boat on the dock. If either is absent, then the boat owner is usually unable to dock the boat alone. Consequently, the boat owner has to organize and coordinate a time to meet with at least one other individual and often take that individual along to sea, which may be undesirable. Differing schedules or lack of interest among family or friends can also be limiting factors, which preclude the boat owner from cruising alone on the boat. Similarly, assuming the individual is found and willing to help, the individual may be suboptimal for docking the boat due to inexperience, fear or physical inability.

Additionally, safety is an important factor when docking the boat, especially if the boat is large. In order to avoid injuries to crewmembers, passengers or bystanders and property damage to the boat, the dock or nearby watercraft, the boat owner usually needs to focus on maneuvering the boat, often in confined space, while remaining fully responsible for the passengers and the crewmembers. Thus, when the boat owner is entertaining several guests on the boat, then the boat owner or one of the crewmembers can be restricted from freely moving around the boat where required for docking. Likewise, if the guests are noisy, rowdy or excessively socializing with the boat owner, then the boat owner can have difficulty mentally focusing or giving docking directions to the crewmembers. Even when the crewmembers are experienced in docking, the guests can contribute to the inability of the boat owner to stably maneuver the boat near the dock for one of the crewmembers to jump off and quickly tie a mooring line to a dock cleat. At worst, the crewmember may misstep and fall overboard, which can be dangerous, especially if the boat is moving or the crewmember is unable to swim. Further, bad weather can complicate docking, especially when the crewmember and the boat owner are unable to communicate with each other clearly or a deck of the boat or the dock are slippery, such as during snow or rain.

Similarly, casting off can also become difficult for the boat owner to safely perform alone. Typically, in order to cast off alone, the boat owner must untie the mooring lines from the dock and then quickly jump onto the boat and return to the helm of the boat. Failure to do so can result in the boat quickly drifting out of reach and out of control, thus exposing the boat owner to potential boat loss or legal liability for any damages resulting from uncontrolled boat operation.

Moreover, when the boat is a sailboat, then docking becomes even more complex because the sailboat is usually docked at a mooring float floating in a mooring field. Consequently, the sailor is unable to throw the mooring line to someone waiting to assist in docking because there is no dock. Similarly, when the sailboat is large, then the sailor is usually unable to safely grab the float by leaning over the bow. Also, if the sailor alone attempts docking via the mooring float and misses, then the sailor needs to quickly run to the helm for maneuvering the sailboat in order to avoid damaging nearby watercraft.

Likewise, casting off the sailboat is complex as well. In order to cast off alone, the sailor typically removes the mooring lines from the bow and runs to the helm in order to regain control of the sailboat as the sailboat drifts away. As a result, many sailboat owners avoid sailing without at least one crewmember able to cast off the mooring line to sail away and to pick up the mooring line upon return to the mooring.

Furthermore, during close quarter maneuvering for docking, one of the crewmembers usually lifts and throws a docking end of the mooring line from the boat onto the dock. However, the line can be large, bulky or heavy. Sometimes, the line can be of such weight that even a strong crewmember may only be able to throw the line a few feet. If a wind were present, then the wind would make throwing of the line even more burdensome. Also, whenever the line is exposed to the elements, then the line's structural integrity may be compromised, thus reducing safety, or the line may retain water, thus adding to the weight. Further, when the line is stored on the boat, then one of the crewmembers would need to carry the line from one area of the boat to the other. On larger boats, especially having reduced exterior space for walking around the boat, if there are no storage lockers on the bow, then such carrying can be dangerous.

For military, municipal, and commercial captains, crew, and vessel owners, the ability to dock a vessel and cast off safely, reliably, efficiently, and in full control in often unfavorable conditions such as icing on vessels and docks, rain, snow, wind, unfavorable currents, darkness, and cold weather can be extremely important. Quite clearly, docking or casting away can be complicated, difficult, or sometimes impossible for someone to perform alone. As such, there is a need to address at least one of the above.

While certain aspects of conventional technologies have been discussed to facilitate the present disclosure, no technical aspects are disclaimed and it is contemplated that the claims may encompass one or more of the conventional technical aspects discussed herein.

SUMMARY OF THE INVENTION

The present disclosure addresses at least one of the above. However, the present disclosure may prove useful in addressing other problems and deficiencies in a number of technical areas. Therefore, the claims, as recited below, should not necessarily be construed as limited to addressing any of the particular problems or deficiencies discussed herein.

An aspect of an example embodiment of the present disclosure is to provide a technology for allowing docking or casting away to be easily, automatically, and reliably performed by the boat owner alone. Accordingly, the present disclosure discloses watercraft docking systems and methods of their operation.

An example embodiment of the present disclosure is a watercraft docking system for installation on a watercraft in order to enable the watercraft to dock to a cleat secured on a dock. The system includes a processing unit configured for receiving a docking command. The unit is configured for placement onboard of the watercraft. The system further includes one or more optical lenses and one or more distance proximity sensors operated by the unit. The lens and distance proximity sensor are configured for placement on the unit onboard the watercraft. The system even further includes a telescoping arm operated by the unit. The arm has a proximal end and a distal end. The proximal end is configured for securing a line or cable onto the watercraft. The system also includes a cleat engager operated by the unit. The engager is situated at the distal end. In response to the unit receiving the command, the unit automatically operates the lens to identify the cleat and telescopes the arm to the cleat such that the engager engages the cleat.

Another example embodiment of the present disclosure is a watercraft configured for docking to a cleat secured on a dock. The watercraft includes a body floating in water and a processing unit secured to the body. The watercraft also includes a control panel secured to the body. The panel issues a docking command to the unit in response to manual operation of the panel. The watercraft further includes one or more optical lenses and one or more distance proximity sensors secured to the body. The unit operates the lens and the distance proximity sensor. The watercraft even further includes a telescoping arm having a proximal end and a distal end. The unit operates the arm. The proximal end is secured to the body. The watercraft additionally includes a cleat engager situated at the distal end. The unit operates the engager. In response to the unit receiving the command, the unit automatically operates the lens and distance proximity sensor to identify the exact location of the cleat and telescope the arm to the cleat such that the engager engages the cleat.

The present disclosure may be embodied in the form illustrated in the accompanying drawings. Attention is called to the fact, however, that the drawings are illustrative. Variations are contemplated as being part of the disclosure, limited only by the scope of the claims. The above and other features, aspects and advantages of the present disclosure will become better understood to one skilled in the art with reference to the following drawings, detailed description and appended claims.

BRIEF DESCRIPTION OF THE DRAWINGS

The accompanying drawings, which are incorporated into and form a part of the specification, illustrate example embodiments of the present disclosure. Together with the detailed description, the drawings serve to explain example embodiments of the present disclosure. The drawings are only for the purpose of illustrating example embodiments of the present disclosure and are not to be construed as necessarily limiting the disclosure. Like numbers can refer to like elements throughout. The above and other aspects, advantages and features of the present disclosure will become better understood to one skilled in the art with regard to the following description, appended claims and accompanying drawings where:

DETAILED DESCRIPTION

Figure 1:
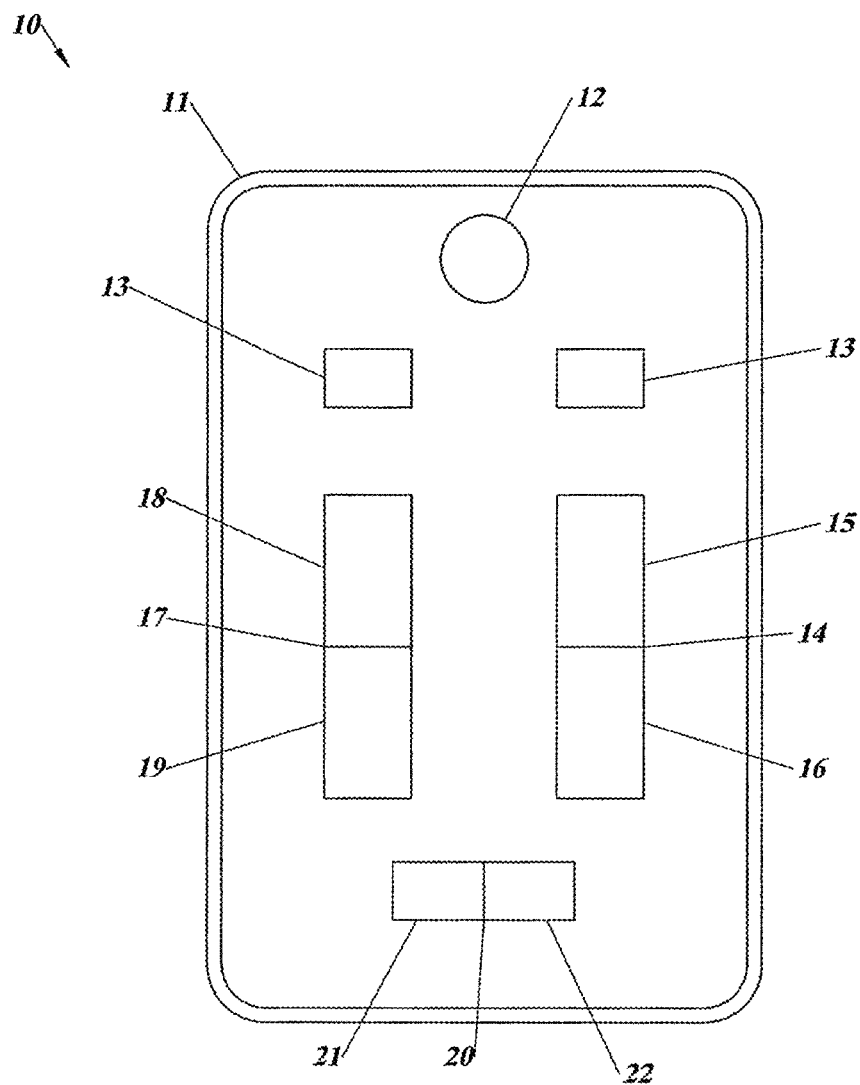
FIG. 1 shows a top view of an example embodiment of a main control panel of a watercraft docking system according to the present disclosure.

The present disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Any verbs as used herein can imply direct or indirect, full or partial, action or inaction. For example, when an element is referred to as being "on," "connected" or "coupled" to another element, then the element can be directly connected or coupled to the other element or intervening elements may be present. In contrast, when an element is referred to as being "directly connected" or "directly coupled" to another element, then there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section and not to imply that any specific number of elements, components, regions, layers or sections is required. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. It will be further understood that the terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross section illustrations that are schematic illustrations of exemplary embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "lower," "above," and "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

As disclosed herein, for all example embodiments, any components or subcomponents can be formed from a same, structurally continuous piece or be separately fabricated and connected.

Hereinafter, the present disclosure will be described in detail with reference to the accompanying drawings.

FIG. 1 shows a top view of an example embodiment of a main control panel 10 of a watercraft docking system according to the present disclosure. Within the context of the present invention, a "watercraft" is any vehicle that is capable of being operated in the water, including powerboats, sailboats, barges, hovercraft, commercial vessels, non-motorized boats, submarines, military vessels, and the like. However, for ease of explanation, embodiments of the present invention are described as being implemented in conjunction with a boat. It will be understood that such references to a "boat" can apply equally to other types of watercraft.

A main control panel 10 provides a user interface for controlling a watercraft docking system installed on a boat. Alternatively, panel 10 provides a user interface for controlling, simultaneously or one at a time, a plurality of docking systems installed on the boat. Also alternatively, when the boat has one or a plurality of docking systems (as described further herein) installed, then a plurality of corresponding panels 10 for controlling the plurality of docking systems can be installed on the boat.

A single person can operate panel 10. For example, any person on the boat, such as a boat owner, a captain, a crewmember or even a passenger, can operate panel 10. Alternatively, a single person can operate panel 10 remotely.

Panel 10 can be installed anywhere on the boat. Panel 10 can be portable or permanently secured onto any portion of the boat. Panel 10 can be wired to control the docking system or can wirelessly control the docking system.

Panel 10 has a body 11, which can include plastic or metallic materials. Body 11 can be of any shape, such as rectangular, square, circular, trapezoidal, triangular or the like. Body 11 can be waterproof. Body 11 includes circuitry electrically coupled to a power source, such as a replaceable battery, a renewable energy generator, such as a solar cell, or a wind turbine, or an on-board electrical system. The circuitry is electrically coupled to a plurality of lamps and switches of panel 10.

Body 11 includes an on/off indicator lamp 12, which, when illuminated, can visually indicate when panel 10 is on or off. Lamp 12 can output light of any color. Lamp 12 can output light of one color when on and another color when off. Lamp 12 can be off when the docking system is off and on when the docking system is on. Lamp 12 can also be off when the docking system is on and on when the docking system is off. Lamp 12 can be any type of lamp, such as light emitting diode (LED).

Body 11 includes a plurality of cleat indicator lamps 13, which correspond to sides of the boat, such as a port side of the boat and a starboard side of the boat. When illuminated, each of lamps 13 can visually indicate when the docking system grasps a cleat (or other securing point) for that side. Lamps 13 can output lights of identical colors or different colors, such as port side lamp 13 being red and starboard side lamp 13 being green or both being red when the docking system did not yet grasp the cleats or both being green when the docking systems grasps the cleats. Lamps 13 can also flash on and off during the docking process, such as yellow.

Body 11 includes a plurality of switches 14, 17, which correspond to sides of the boat, such as the port side of the boat and the starboard side of the boat. Each of switches 14, 17 has a docking position 15, 18 and a retracting position 16, 19, respectively. When switches 14, 17 are switched to the docking positions 15, 18, then the docking system initiates docking processes for the port side of the boat and the starboard side of the boat. When switches 14, 17 are switched to the retracting positions 16, 19, then the docking system initiates retraction processes for the port side of the boat and the starboard side of the boat. Switches 14, 17 can be identical or different in appearance. Alternatively, body 11 includes buttons or sliders corresponding to functionality of switches 14, 17. Also alternatively, body 11 includes one switch for controlling the docking system, wherein the docking system automatically determines, such as via a distance proximity sensor, on which side to dock.

Body 11 includes an on/off switch 20 having an on position 21 and an off position 22. When switched to the on position 21, the switch 20 allows the user to operate the docking system via panel 10. When switched to the off position 22, then switch 20 prohibits the user from operating the docking system via panel 10.

In another example embodiment, the panel 10 is a touch screen displaying visual elements corresponding to functionality described above. The touch screen can be voice activated and controlled.

In yet another example embodiment, the panel 10 is a mobile application for a tablet computer, a smartphone, or other mobile device. The mobile application displays visual elements corresponding to the functionality described above. The mobile application can be voice activated and controlled.

Figure 2:
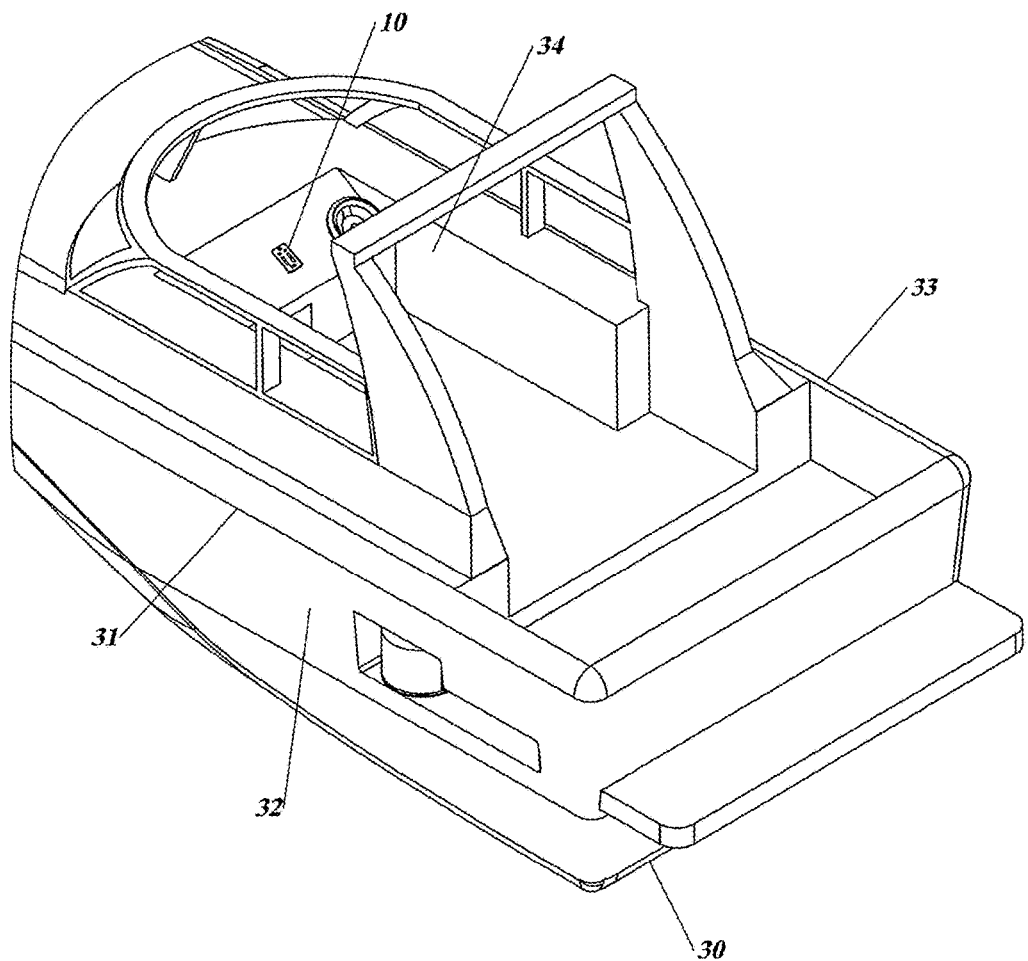
FIG. 2 shows a perspective view of an example embodiment of the main control panel installed at a helm of a boat according to the present disclosure.

FIG. 2 shows a perspective view of an example embodiment of the main control panel 10 installed at a helm of a boat according to the present disclosure. Some elements of this figure are described above. Thus, same reference characters identify same or like components described above and any repetitive detailed description thereof will hereinafter be omitted or simplified in order to avoid complication.

A boat 30 has a sidewall 31, a port side 32, a starboard side 33 and a helm 34. Although sidewall 31 has a sidewall opening, sidewall 31 can lack the sidewall opening or boat 30 can lack sidewall 31. Sidewall 31 can have any thicknesses according to principles of the present disclosure. Panel 10 is installed near helm 34 for aiding a boat operator in docking of the boat via the docking system. However, panel 10 can be installed in any area of boat 30 or be mobile, whether with respect to boat 30 or on boat 30.

Figure 3:
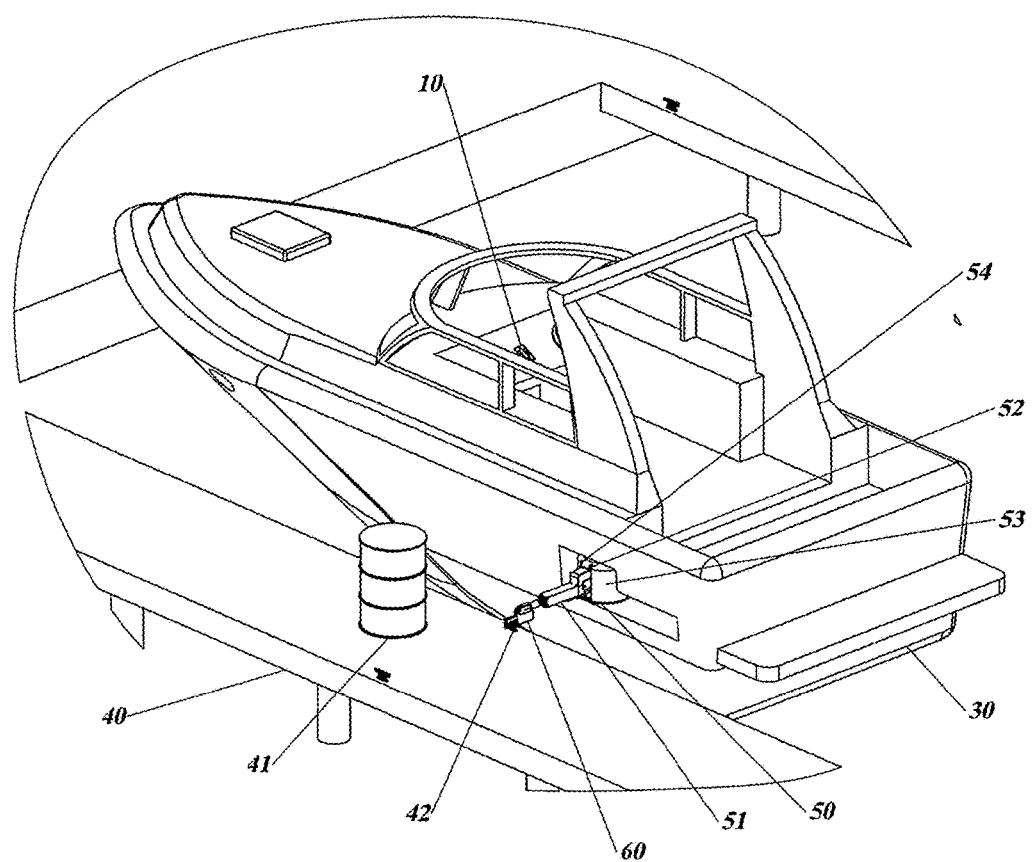
FIG. 3 shows a perspective view of an example embodiment of the boat docked at a dock via the watercraft docking system controlled by the main control panel according to the present disclosure.

FIG. 3 shows a perspective view of an example embodiment of the boat 30 docked at a dock 40 via the watercraft docking system controlled by the main control panel 10, according to the present disclosure. Some elements of this figure are described above. Thus, same reference characters identify same or like components described above and any repetitive detailed description thereof will hereinafter be omitted or simplified in order to avoid complication.

A dock 40 has a barrel 41 standing thereon and a dock cleat 42 secured thereto. Dock 40 can include any type of materials, such as plastic, metal, wood or the like. Dock 40 can be any type of dock, pier, slip, marina or the like. Dock 40 can be stationary or floating. Dock 40 can be a mooring float or a piling. Dock 40 can even be another watercraft. Cleat 42 is a dual anvil cleat in this exemplary embodiment. Cleat 42 can include any type of materials, such as plastic, metal, wood or the like. Cleat 42 can be any type of a dock cleat, such as an anvil cleat. Cleat 42 also can be a grabbing portion of a mooring float or a piling, or any other type of securing point by which the boat 30 can be reversibly secured to the dock 40.

Boat 30 is docked at dock 40 via a watercraft docking system 50, which is installed onto boat 30, engaging cleat 42. Docking system 50 is controlled, wired or wirelessly, via panel 10. Alternatively, docking system 50 can be remotely controlled, such as via an antenna. Any component or subcomponent of docking system 50 can be rustproof, waterproof or include plastic, metal, wood or the like. Such components or subcomponents can include or be coated with materials to resist structural deformation or corrosion from exposure to salty water, heat or other elements. Docking system 50 can be installed on deck of boat 30 or below deck of boat 30 or in the hull of the boat 30.

Docking system 50 includes a telescoping arm 51 having a proximal end and a distal end. Alternatively, docking system 50 can include a plurality of arms 51. Docking system 50 includes a nesting station, such as a domed tower 53, and a cleat engager, such as a cleat engager element 60. Alternatively, docking system 50 can include a plurality of nesting stations, such as towers 53. Arm 51 is operably coupled to tower 53 at the proximal end. Cleat engager element 60 is located near, nested into or engages the distal end of arm 51. Alternatively, a plurality of cleat engagers, such as cleat engager elements 60, can be located near, nested into or engaging the distal end of arm 51. Docking system 50 includes one or more optical lenses 52 and one or more sensors installed onto tower 53. Docking system 50 includes a software system for operating arm 51, tower 53, cleat engager element 60, lens 52, and distance proximity sensor 54. Docking system 50 can have its own power source or use boat 30 electrical systems or use an on-board renewable energy system, even if solely dedicated for use of docking system 50. Also, docking system 50 can have a back-up power source. In an example mode of operation, in response to switching switch 17 to docking position 18, the software system, using computer vision via lens 52 and distance proximity sensor 54, locates and identifies cleat 42 at dock 40 and then guides and outwardly telescopes arm 51 to cleat 42 such that cleat engager element 60 grasps cleat 42 to dock boat 30 to dock 40.

Arm 51 telescopes away from the tower 53 to cleat 42 when activated via panel 10. Alternatively, arm 51 can be activated automatically. Arm 51 moves within the sidewall window. Alternatively, arm 51 can be placed within an indention in the sidewall. Or alternatively, arm 51 can telescope over sidewall 31. Also alternatively, arm 51 can operate on boats lacking sidewalls. Arm 51 includes a plurality of interconnected telescoping arm tubular rigid elements, concentric to each other, which move by sliding out one from another and thereby lengthening arm 51 from its rest state. When retracting, the arm elements collapse into each other. Arm 51 can be electrically motorized, hydraulic or pneumatic. Arm 51 can telescope from the widest arm element to the narrowest arm element or from the narrowest arm element to the widest arm element. Arm 51 can include springs, semi-rigid wires, cables, pulleys, racks and pinions, and helical threads. For example, when fully telescoped, arm 51 can be ten feet long.

Tower 53 is secured on the deck of boat 30. Tower 53 can have interior space storing therein various docking system 50 components, such as motors, servos, processors, wires, pneumatic or hydraulic components, and the like. Tower 53 can be stationary. Tower 53 can be automatically or manually inclined or declined or raised or lowered. Tower 53 can be automatically or manually rotatable on its axis for any amount of degrees with respect to boat 30. For example, tower 53 can rotate 180 degrees as if from facing the aft of boat 30 to facing the bow of boat 30, such as 90 degrees in one direction and 90 degrees in another direction. For another example, tower 53 can fully rotate 360 degrees on its axis.

Tower 53 can lack a dome. Alternatively, tower 53 can be a frame-like structure. Tower 53 can be any shape, such as a cylinder or a cube, according to the present disclosure. A height of tower 53 can be greater than a height of sidewall 31. Tower 53 or any other tower can be structured so as to be compact and preclude being a substantial tripping hazard for passengers or crew of boat 30.

At least one of the arm elements can be attached to at least one servomotor electrically coupled to electrical system of boat 30. The servomotor can be stationed within tower 53 or on boat 30 or other portions of docking system 50. The servomotor provides for at least one of horizontal, vertical and diagonal movement of arm 51. For example, arm 51 can have a range of movement of 180 degrees, whether horizontally, vertically or diagonally, such as 90 degrees in one direction and 90 degrees in another direction. For another example, arm 51 can have a range of movement of 120 degrees, whether horizontally, vertically or diagonally, such as 60 degrees in one direction and 60 degrees in another direction.

Arm 51 houses an inner cable secured onto a reel stationed within tower 53. The inner cable can include nylon, graphite, plastic, polyester, or steel. The inner cable can be a rope or a chain. In one embodiment, the reel is powered via an electric motor electrically coupled to electrical system of boat 30. The reel is secured onto boat 30. The motor can operate at various speeds. The motor is stationed within tower 53. The motor can be powerful enough to move boat 30 closer to dock 40, under any weather conditions, such as strong winds.

Lens 52 and distance proximity sensor 54 are installed near the top of tower 53 Lens 52 has a view or a line of sight substantially unblocked by sidewall 31. Alternatively, lens 52 and distance proximity sensor 54 are installed on the actual body of boat 30 or other structures stationed on boat 30 as long as the line of sight of lens 52 is substantially unblocked from locating cleat 42. Also alternatively, lens 52 and distance proximity sensor 54 are installed in another area of tower 53, such as a middle area, a bottom area, or a side area, as long as the line of sight of lens 52 is substantially unblocked from locating cleat 42. Also alternatively, lens 52 and distance proximity sensor 54 can be installed on arm 51. Lens 52 and distance proximity sensor 54 can also be installed on the hull of the vessel. Tower 53 or docking system 50 can include more than one lens 52 and more than one distance proximity sensor 54. For docking, lens 52 can be autofocused automatically so as to facilitate location and identification of cleat 42. Lens 52 and distance proximity sensor 54 can be electrically coupled to electrical system of boat 30. Lens 52 and distance proximity sensor 54 can have their own processor for operating lens 52 and distance proximity sensor 54. Lens 52 and distance proximity sensor 54 can be stationary or lens 52 and distance proximity sensor 54 can be rotatable, moveable, inclinable, whether horizontally, vertically or diagonally.

Tower 53 can also include a light source, such as an LED flash lamp, for providing light in darkness for lens 52. Alternatively, tower 53 or docking system 50 has a plurality of light sources. The light source can be electrically coupled to electrical system of boat 30. The light source can be stationary or moving. The light source can output light in wavelength invisible to humans. The computer system automatically determines when to activate and deactivate the light source, such as when the computer system senses dark lighting conditions or upon docking. The light source can be activated for extended periods of time or for brief moments. In other example embodiments, docking system can include night lenses, low light cameras, laser range finders and the like.

Cleat engager element 60 is located near, nested into or engages the distal end of arm 51. Cleat engager element 60 is connected to the inner cable. Alternatively, cleat engager element 60 is coupled to the distal end of arm 51. Cleat engager element 60 can be a carabiner, a claw, a hook or any other cleat engager mechanism, as known in the art. Cleat engager element 60 can include photoelectric sensors for detecting engagement of cleat 42 by element 60.

A processing unit is stationed within tower 53 or elsewhere on boat 30 or even within arm 51. Panel 10 can include the processing unit.

The processing unit includes a computer processor operably coupled to a computer memory. For docking or casting off, the processing unit controls operation of docking system 50, including operation of at least arm 51, lens 52 and distance proximity sensor 54, element 60 and tower 53. The processing unit can control other components of docking system 50. In an example embodiment, when various components of docking system 50 each have their own computer processor or docking system 50 has a plurality of computer processors, then the processing unit functions as a main controller with other processors being subservient to the processing unit. In another example embodiment, the processing unit includes an antenna for remote activation or deactivation of docking system 50.

The processor can be a single core processor, a dual core processor or a multi-core processor. The memory can include volatile or non-volatile memory. One example of the memory is flash memory. The memory stores a set of instructions for execution on the processor in order to dock or cast off boat 30 via docking system 50. The instructions relate to performance of various tasks and subtasks by various components and subcomponents of docking system 50. For example, the instructions relate to computer vision and corresponding docking system 50 operations, functionality and tasks, such as at least one of machine vision, depth perception, distance recognition, radar, pattern recognition, imaging, color recognition, laser range finding, artificial intelligence, machine learning, signal processing, image processing, nighttime operation, night vision, image intensification, active illumination, thermal imaging, arm 51 telescoping, tower 53 operation, motion detection, edge detection, cleat detection, cleat recognition, cleat grasping via element 60, and the like. Thus, the set of instructions can be represented by one or more software applications (or even a combination of software and hardware, e.g., using Application Specific Integrated Circuits (ASIC)), where the software is loaded from a storage medium (e.g., an input/output devices) and operated by the processor in the memory. Thus, in one embodiment, the set of instructions for docking or casting off boat 30 via docking system 50 described herein can be stored on a tangible or non-transitory computer readable storage medium (e.g., RAM, magnetic or optical drive or diskette, and the like). Even more details as to operation of docking system 50 are described below.

Figure 4A:
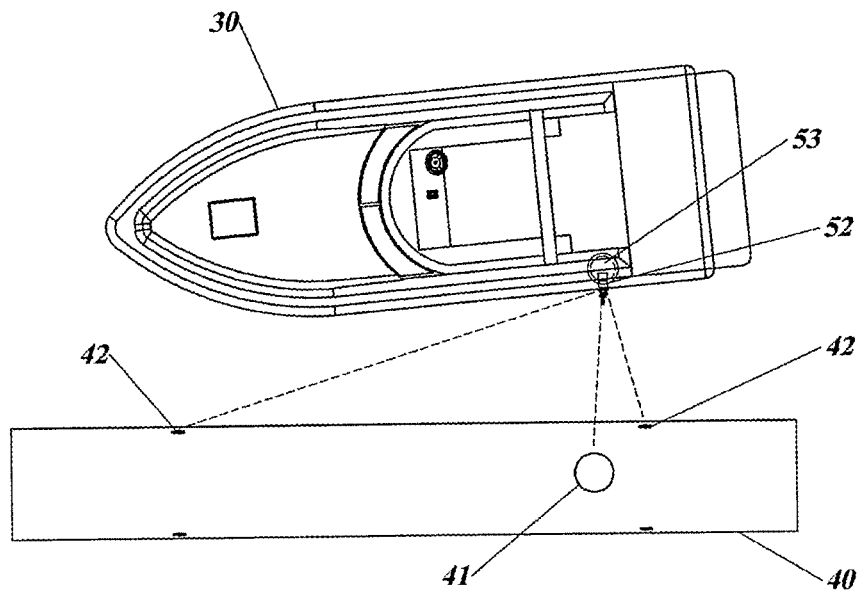
FIG. 4A shows a top view of an example embodiment of the watercraft docking system using computer vision to distinguish between cleats and a barrel on the dock according to the present disclosure.

FIG. 4A shows a top view of an example embodiment of the watercraft docking system using computer vision to distinguish between cleats 42 and a barrel 41 on the dock 40 according to the present disclosure. Some elements of this figure are described above. Thus, same reference characters identify same or like components described above and any repetitive detailed description thereof will hereinafter be omitted or simplified in order to avoid complication.

In an example mode of operation, as portside 32 of boat 30 approaches dock 40, someone on boat 30, such as a boat owner, a captain, a crewmember or a passenger, approaches panel 10 and activates switch 20 to the on position 21. In response, lamp 12 illuminates, thereby indicating activation of system 50. For example, portside 32 can be ten feet away from dock 40.

Next, the someone (or another individual) activates switch 17 to the docking position 18. In response, as controlled by the processing unit, lens 52 starts scanning its line of sight in order to search, locate and identify a cleat 42 appropriate for grasping, such as one of cleats 42, by cleat engager element 60. By executing some of the instructions, as described above, the processing unit assists lens 52 in searching, locating and identifying the cleat 42 appropriate for grasping. For example, if the area near dock 40 is poorly illuminated or dark, such as during nighttime, fog or in a tunnel, then the processing unit can automatically activate the flash lamp to provide illumination so that lens 52 can more quickly locate and identify the cleat 42 appropriate for grasping. There are many ways to determine which cleat 42 is appropriate for grasping. One such way is determine which cleat is nearest to tower 53.

Note that as lens 52 scans its line of sight, unblocked by sidewall 31, lens 52 notices other objects on dock 40, such as barrel 41. However, the processing unit instructs lens 52 to ignore barrel 41 and continue to search for, locate and identify cleats 42 on dock 40.

Figure 4B:
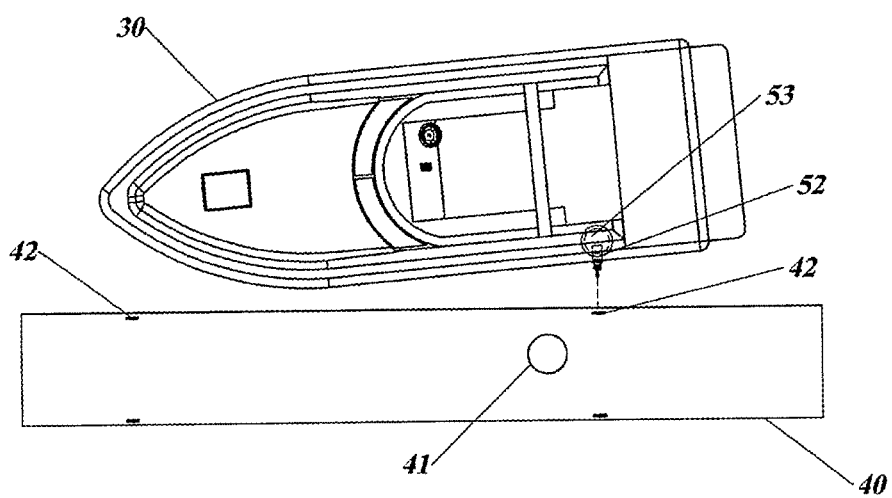
FIG. 4B shows a top view of an example embodiment of the watercraft docking system using computer vision to identify the nearest cleat from the cleats on the dock according to the present disclosure.

FIG. 4B shows a top view of an example embodiment of the watercraft docking system using computer vision to identify a nearest cleat from the cleats 42 on the dock 40 according to the present disclosure. Some elements of this figure are described above. Thus, same reference characters identify same or like components described above and any repetitive detailed description thereof will hereinafter be omitted or simplified in order to avoid complication.

Upon successful location and identification of the cleat 42 appropriate for docking, such as cleat 42 located on the right side of dock 40, the processing unit begins to continuously track the geographic position of the located and identified cleat 42 with respect to boat 30. The processing unit simultaneously or after cleat identification also gets docking system 50 ready for docking, such as via initiating the servomotors. As noted above, lens 52 ignores non-cleat objects on dock 40.

Figure 4C:
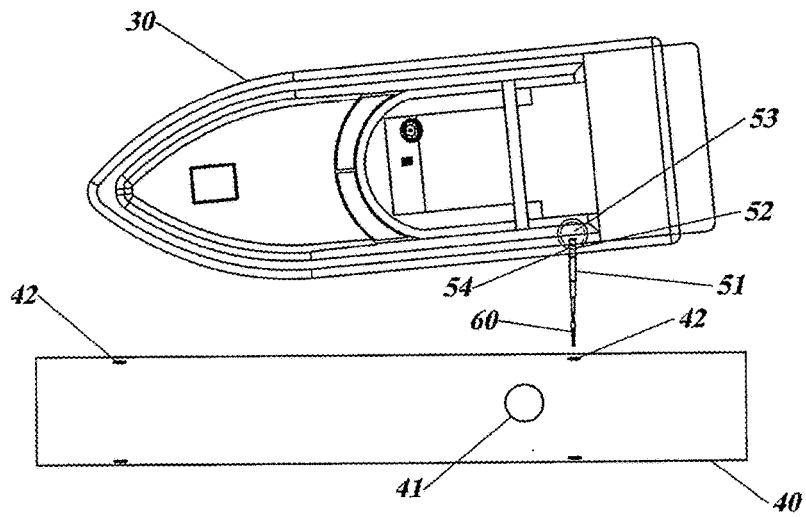
FIG. 4C shows a top view of an example embodiment of a telescoping arm of the watercraft docking system telescoping to the nearest cleat according to the present disclosure.

FIG. 4C shows a top view of an example embodiment of a telescoping arm 51 of the watercraft docking system telescoping to the nearest cleat (e.g., cleat 42) according to the present disclosure. Some elements of this figure are described above. Thus, same reference characters identify same or like components described above and any repetitive detailed description thereof will hereinafter be omitted or simplified in order to avoid complication.

The processing unit determines if cleat 42 is within range of arm 51. If so, then, as controlled by the processing unit, docking system 50 begins to outwardly telescope arm 51. Such telescoping occurs by expanding arm 51 away from boat 30 such that the arm elements slide out one from another and arm 51 thereby expands in length. During the telescoping, the distal end of arm 51 moves away from tower 53 toward cleat 42. The processing unit controls movement, direction and outwardly telescoping speed of arm 51, as aided by images as input via lens 52.

Located at the distal end of arm 50 is cleat engager element 60, which is ready to grasp cleat 42. Cleat engager element 60 can be any cleat engager mechanism or device.

If the processing unit determines that cleat 42 is out of range of telescoping arm 51, then the processing unit can retract arm 51 if arm 51 already began expanding or prohibit retraction of arm 51 or provide for an audio signal indicating such.

As illustrated via FIG. 4C, cleat engager element 60 is secured onto the inner cable. More particularly, cleat engager element 60 is situated at the distal end of arm 51 and held in place by one end of the inner cable under tension from the reel. The other end of the inner cable is secured onto the reel, which is housed within tower 53. Cleat engager element 60 is greater in size than the arm element at the distal end so that cleat engager element 60 is prevented from moving into that arm element. During such telescoping, the inner cable is pulled, thereby rolling the reel, such that the inner cable moves and extends through arm 51 from the reel to the distal end. The inner cable can extend from the reel in a highly regulated manner via the electric motor operating corresponding to the telescoping. Alternatively, the reel can freely rotate to extend the inner cable through arm 51 as arm 51 telescopes outward.

Figure 4D:
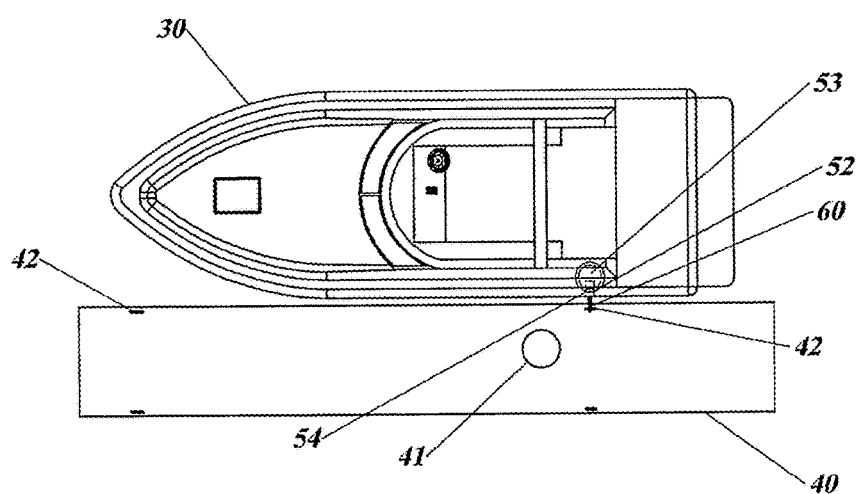
FIG. 4D shows a top view of an example embodiment of the boat docked at the dock via the watercraft docking system according to the present disclosure.

FIG. 4D shows a top view of an example embodiment of the boat 30 docked at the dock 40 via the watercraft docking system according to the present disclosure. Some elements of this figure are described above. Thus, same reference characters identify same or like components described above and any repetitive detailed description thereof will hereinafter be omitted or simplified in order to avoid complication.

As the distal end of arm 51 brings cleat engager element 60 near cleat 42, the processing unit activates cleat engager element 60 to grasp cleat 42. The grasp should be secure. The grasp can be any type of grasping, such as clawing, grasping, carabinering, hooking, surrounding or any other type of grasping as known in the art. If for some reason cleat engager element 60 does not grasp cleat 42, then the processing unit allows for iterative processing until successfully grasping by cleat engager element 60 or manual deactivation of docking system 50.

Upon grasping cleat 42 by cleat engager element 60, as determined by the processing unit, arm 51 can begin to inwardly telescope, toward tower 53. Such inward telescoping occurs by retracting arm 51 towards boat 30 such that the arm elements slide in one into another and arm 51 thereby retracts in length. During such inward telescoping, the distal end of arm 51 moves from near cleat 42 toward tower 53. The processing unit controls movement, direction and inwardly telescoping speed of arm 51, whether as aided by images as received via lens 52 or not. Such inward telescoping exposes the inner cable onto which cleat engager element 60 is secured to. Thus, the inner cable serves as the mooring line between cleat 42 and boat 30. The inner cable is sufficiently strong to preclude snapping or any other structural deformations from tensile pressure, boat 30 or dock 40 pulling, moisture or weather.

Also upon grasping cleat 42 by cleat engager element 60, and depending upon the distance of the boat to the edge of the dock, the processing unit can activate the electric motor, which is electrically coupled to the reel. The electric motor begins to spin the reel inward thereby rolling and pulling the inner cable. Consequently, boat 30 begins to move toward dock 40. For safety and avoiding collision or damage to boat 30 and dock 40, the processing unit determines, such as via lens 52 and distance proximity sensor 54 or other sensors, whether onboard or external to boat 30, the extent of such movement and other conditions, such as boat 30 speed, weather conditions, water conditions or distance between boat 30 and dock 40, and controls the electric motor accordingly. For example, if the processing unit determines that boat 30 will collide with dock 40, then the processing unit can instruct the electric motor to reduce speed or halt operation. Similarly, if the processing unit determines that a human being or other obstruction is in the water between boat 30 and dock 40, the processing unit can halt operation of the electric motor.

Also upon grasping cleat 42 by cleat engager element 60, the processing unit can output signal to illuminate light 13, which indicates that cleat 42 is securely grasped.

For casting off boat 30 from dock 40, the above process can be reversed. For example, upon switching switch 17 to retracting position 19, as controlled by the processing unit, arm 51 telescopes outward to cleat 42 for receiving cleat engager element 60 at the distal end. The distal end of arm 51 receives cleat engager element 60. Arm 51 contacts and locks onto cleat engager element 60 via a spring loaded ball in the distal end of Arm 51 settling into a depression in the receiving end of cleat engager element 60. Cleat engager element 60 ungrasps cleat 42. Arm 51 telescopes inward to tower 53, while carrying cleat engager element 60 and the electric motor reeling in the inner cable such that cleat engager element 60 avoids hanging off arm 51 or avoids coming in direct contact with a body of water in which boat 30 floats.

Figure 5:
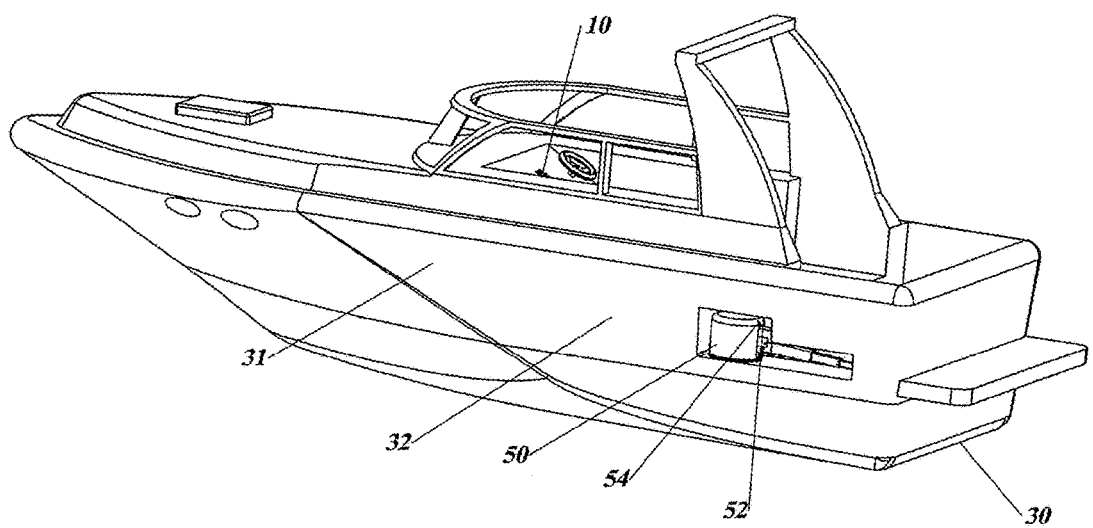
FIG. 5 shows a perspective view of another example embodiment of the watercraft docking system according to the present disclosure.

FIG. 5 shows a perspective view of another example embodiment of the watercraft docking system 50 according to the present disclosure. Some elements of this figure are described above. Thus, same reference characters identify same or like components described above and any repetitive detailed description thereof will hereinafter be omitted or simplified in order to avoid complication.

Docking system 50 is installed onto sidewall 31 on portside 32 of boat 30. Alternatively, docking system 50 can be installed onto a sidewall on starboard side 33 of boat 30 or the aft end or the bow end of boat 30. Also alternatively, boat 30 can have a plurality of docking systems 50 installed thereon.

Similar to above, docking system 50 includes the tower, arm (illustrated in the retracted position in FIG. 5), lens 52, distance proximity sensor 54, and cleat engager element 60. Docking system 50 also includes the processing unit for controlling docking system 50 for docking and casting off of boat 30. The nesting station can be installed within sidewall 31 such that when the arm is fully retracted, then sidewall 31 is substantially smooth, such as by having a pocket within sidewall 31 for storing the arm. The tower can be structured in order to reduce aerodynamic impact on boat 30 or prevent creating extra drag. Also, when the arm is retracted, then the arm and cleat engager element 60 can snugly fit within the nesting station. Alternatively, a portion of at least one of them can protrude from the nesting station. Lens 52 can be placed on the nesting station or somewhere else on boat 30 or even on the arm without substantially blocking the line of sight lens 52. The processing unit can be stationed within the nesting station or somewhere else on boat 30 or even on the arm.

Sidewall 31 is sufficiently thick and strong to bear the weight and securely hold tower 50, arm, lens 52, distance proximity sensor 54, and cleat engager element 60, regardless of whether the arm is expanded or retracted.

Figure 6A:
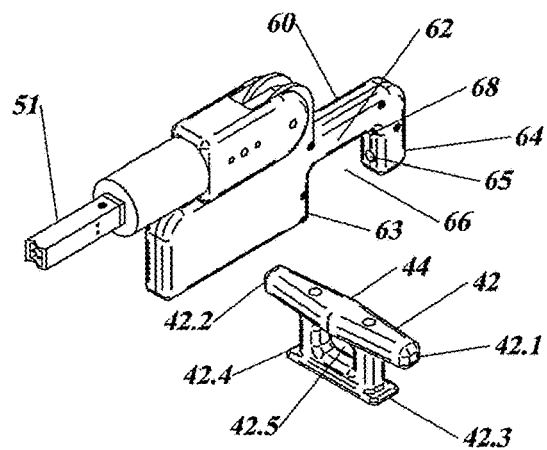
FIG. 6A shows a perspective view of an example embodiment of a cleat engager element before grasping the nearest cleat according to the present disclosure.

FIG. 6A shows a perspective view of an example embodiment of a cleat engager Element 60 before grasping the nearest cleat (e.g., cleat 42) according to the present disclosure. Some elements of this figure are described above. Thus, same reference characters identify same or like components described above and any repetitive detailed description thereof will hereinafter be omitted or simplified in order to avoid complication.

In one embodiment, the cleat 42 is a dual anvil cleat. Cleat 42 includes a first anvil 42.1 connected to a first base 42.3, which is anchored to dock 40, and a second anvil 42.2 connected to a second base 42.4, which is anchored to dock 40. First anvil 42.1 is connected to second anvil 42.2 via an anvil-interconnecting portion 44. Bases 42.3 and 42.4 and anvils 42.1 and 42.2 define a space 42.5 therebetween, which is below the anvil-interconnection Portion 44. Space 42.5 can be U-shaped, V-shaped, C-shaped and the like.

Cleat engager element 60 is situated at the distal end of arm 51. An inner cable 61 extends through arm 51. Cable 61 has two ends. At one end (not illustrated), cable 61 is connected to the reel on boat 30. At the other end, cable 61 is connected to cleat engager element 60.

Cleat engager element 60 includes a cable end 63, a cleat end 64 and a bay portion 62 therebetween. Cable end 63 is connected to cable 61. Cleat end 64 is opposite of cable end 63. Bay portion 62 defines a bay 66, which is sufficiently sized to receive the anvil-interconnecting portion 44. Cleat engager element 60, at cleat end 64, includes a bore 65. Alternatively, cable end 63 includes bore 65. As illustrated, cleat engager element 60 is positioned above cleat 42 for grasping.

Figure 6B:
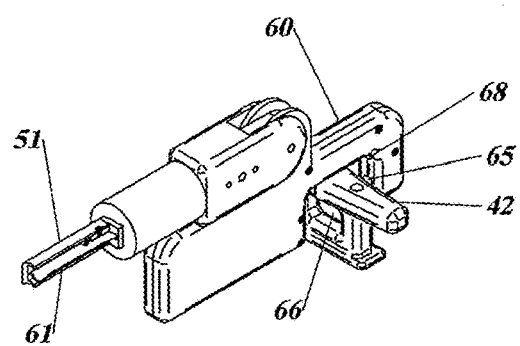
FIG. 6B shows a perspective view of an example embodiment of the cleat engager element during grasping the nearest cleat according to the present disclosure.

FIG. 6B shows a perspective view of an example embodiment of the cleat engager element 60 during grasping the nearest cleat (e.g., cleat 42) according to the present disclosure. Some elements of this figure are described above. Thus, same reference characters identify same or like components described above and any repetitive detailed description thereof will hereinafter be omitted or simplified in order to avoid complication.

Arm 51 brings cleat engager element 60 near or over cleat 42 for grasping. Note that the anvil-interconnecting portion 44 is within bay 66 of bay portion 62. Also note that bore 65 is below the anvil-interconnecting portion.

Figure 6C:
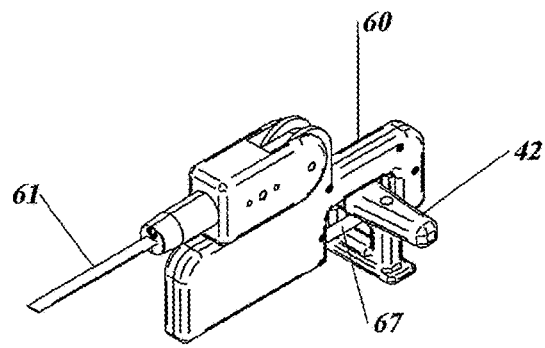
FIG. 6C shows a perspective view of an example embodiment of the cleat engager element after grasping the nearest cleat according to the present disclosure.

FIG. 6C shows a perspective view of an example embodiment of the cleat engager element 60 after grasping the nearest cleat (e.g., cleat 421 according to the present disclosure. Some elements of this figure are described above. Thus, same reference characters identify same or like components described above and any repetitive detailed description thereof will hereinafter be omitted or simplified in order to avoid complication.

Cleat engager element 60 can include at least one sensor, such as photoelectric sensor 68, for sensing when the anvil-interconnecting portion 44 clears bore 65, such as being above bore 65. For example, the sensor can be located anywhere on bay portion 62 facing bay 66 or on cleat end 64 or cable end 63.

Cable end 63 includes a gate 67, which can slide, swivel or move into bore 65 so as to create a secure loop thereby locking the anvil-interconnecting portion 44 within bay 66. Alternatively, cleat end 64 or bay portion 62 can include gate 67. Gate 67 can include metallic materials. Gate 67 is sufficiently strong to preclude snapping or any other structural deformations from pressure, moisture or weather. Thus, when the sensor senses that the anvil-interconnecting portion 44 cleared bore 65, the sensor 68 sends a signal indicating such occurrence to the processing unit. In response, the processing unit activates gate 67 to create the loop and securely lock the anvil-interconnecting portion 44 within bay 66. As a result, boat 30 is docked to cleat 42 of dock 40 via inner cable 61, serving as the mooring line, connected to element 60, as delivered via arm 51, and the nesting station.

In example embodiments, the watercraft docking systems and methods of their operation, as disclosed herein, include permutations of components or subcomponents, which are identical or different from each other, as known to one skilled in the art to which the present disclosure most relevantly pertains.

In example embodiments, the watercraft docking systems and methods of their operation, as disclosed herein, are used for docking the watercraft in the water. Accordingly, docking system 50 is configured for such docking, as known to one skilled in the art to which the present disclosure most relevantly pertains.

In example embodiments, the watercraft docking systems and methods of their operation, as disclosed herein, are used with boats and any other watercraft, whether manned or unmanned, whether propelled via an engine, sails, or humans, whether primarily traveling on water surface or below water surface. Some examples of such watercraft include any marine vessels, such as boats, ships, yachts, sailboats, barges, tankers, submarines, robotic marine vehicles, hovercraft, seaplanes, or the like.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Figure 7:
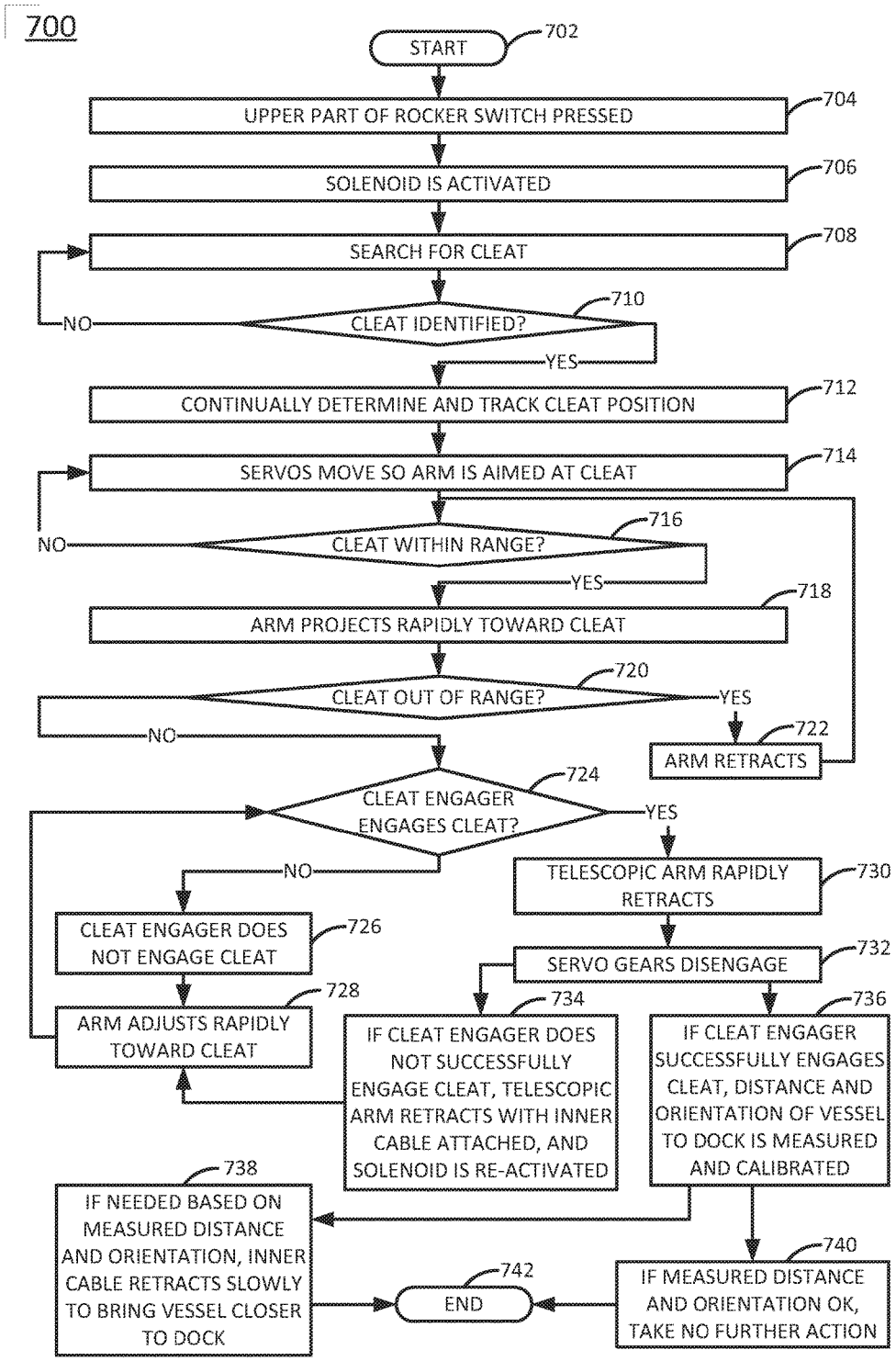
FIG. 7 is a flow diagram illustrating one embodiment of a method for docking a watercraft, according to the present disclosure.

FIG. 7 is a flow diagram illustrating one embodiment of a method 700 for docking a watercraft, according to the present disclosure. Reference is made in the discussion of the method 700 to various elements of the preceding Figures (e.g., components of the docking system 50); however, such reference is not intended to limit operation of the method 700 to the structural embodiments illustrated.

The method 700 begins in step 702. In step 704, part of a rocker switch is pressed or otherwise activated. For instance, the switch 14 or 17 may be moved to the docking position 15 or 18, respectively.

In step 706, in response to the switch being pressed, a solenoid is activated. which retracts gate 67 into cleat engager element 60. Also, in step 708, a lens 52 begins to search for a cleat or other securing point on a dock to which the watercraft is to be docked. Steps 706 and 708 may occur serially or in parallel with each other.

In step 710, the lens 52 identifies a cleat. The lens 52 and distance proximity sensor 54 continually determine and track the position of the cleat in step 712. As the cleat's position is tracked, the arm 51 is moved or guided in step 714 so as to be aimed at the cleat.

When the cleat is within range of the docking system 50 in step 716, the arm 51 with the inner cable 61 is projected toward the cleat in step 718. If the cleat moves out of range in step 720, the arm 51 with inner cable 61 is retracted in step 722 until the cleat is once again within range (step 716).

When the arm 51 has been projected far enough, the cleat engager 60 comes down on the cleat 42 and the anvil-interconnecting portion 44 breaks the beam of the photoelectric sensor 68 causing the solenoid to be deactivated and thereby allowing the gate 67 to spring forward which locks the cleat engager 60 around the cleat 42 in step 724. For instance, the cleat engager 60 may engage the cleat 42. If the cleat engager 60 does not engage the cleat 42 in step 726, the position of the arm 51 relative to the cleat 42 is adjusted in step 728 until the cleat 42 is engaged (step 724).

Several things occur once the cleat engager 60 engages the cleat 42 in step 724. For one, the arm 51 retracts in step 730. Gears are disengaged allowing arm 51 to move freely in step 732. In step 734, if the cleat engager 60 does not successfully engage the cleat 42, the gears will reengage and the arm 51 retracts with the inner cable 61 attached, and the solenoid is reactivated; the position of the arm 51 relative to the cleat 42 is then adjusted (step 728) until the cleat 42 is engaged (step 724). Lastly, in step 736, the distance and orientation of the watercraft relative to the dock is measured and calibrated using lens 52 and distance proximity sensor 54. Depending on the measured distance and orientation, the inner cable 61 of the arm 51 may be slowly retracted in step 738 to bring the watercraft closer to the dock, or no action may be required (step 740).

The method 700 ends in step 742.

Figure 8:
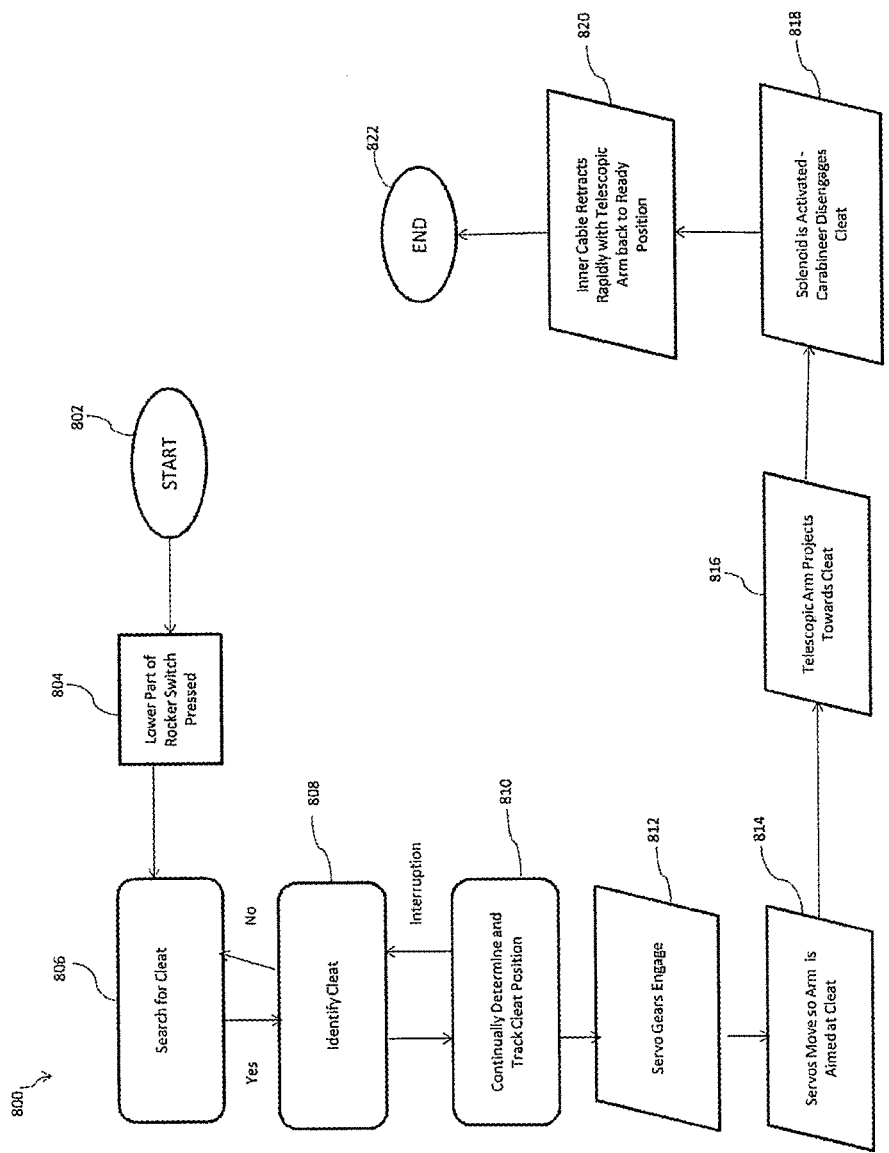
FIG. 8 is a flow diagram illustrating one embodiment of a method for casting a watercraft off from a dock, according to the present disclosure.

FIG. 8 is a flow diagram illustrating one embodiment of a method 800 for casting a watercraft off from a dock, according to the present disclosure. Reference is made in the discussion of the method 800 to various elements of the preceding Figures (e.g., components of the docking system 50); however, such reference is not intended to limit operation of the method 800 to the structural embodiments illustrated.

The method 800 begins in step 802. In step 804, part of a rocker switch is pressed or otherwise activated. For instance, the switch 14 or 17 may be moved to the retracting position 16 or 19, respectively.

In step 806, in response to the switch being pressed, a lens 52 begins to search for the cleat 42 engaged by the cleat engager 60 on a dock to which the watercraft is docked.

In step 808, the lens 52 identifies a cleat 42. The lens 52 and distance proximity sensor 68 continually determine and track the position of the cleat 42 in step 810. As the cleat's position is tracked, gears are engaged in step 812, and the arm 51 is moved and guided in step 814 so as to be aimed at the cleat 42.

The arm 51 is then projected toward the cleat 42 in step 816. The solenoid is then activated in step 818, and the cleat engager 60 disengages from the cleat 42.

The inner cable 61 is then retracted with the telescopic arm 51 into the ready position in step 820.

The method 800 ends in step 822.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Figure 9:
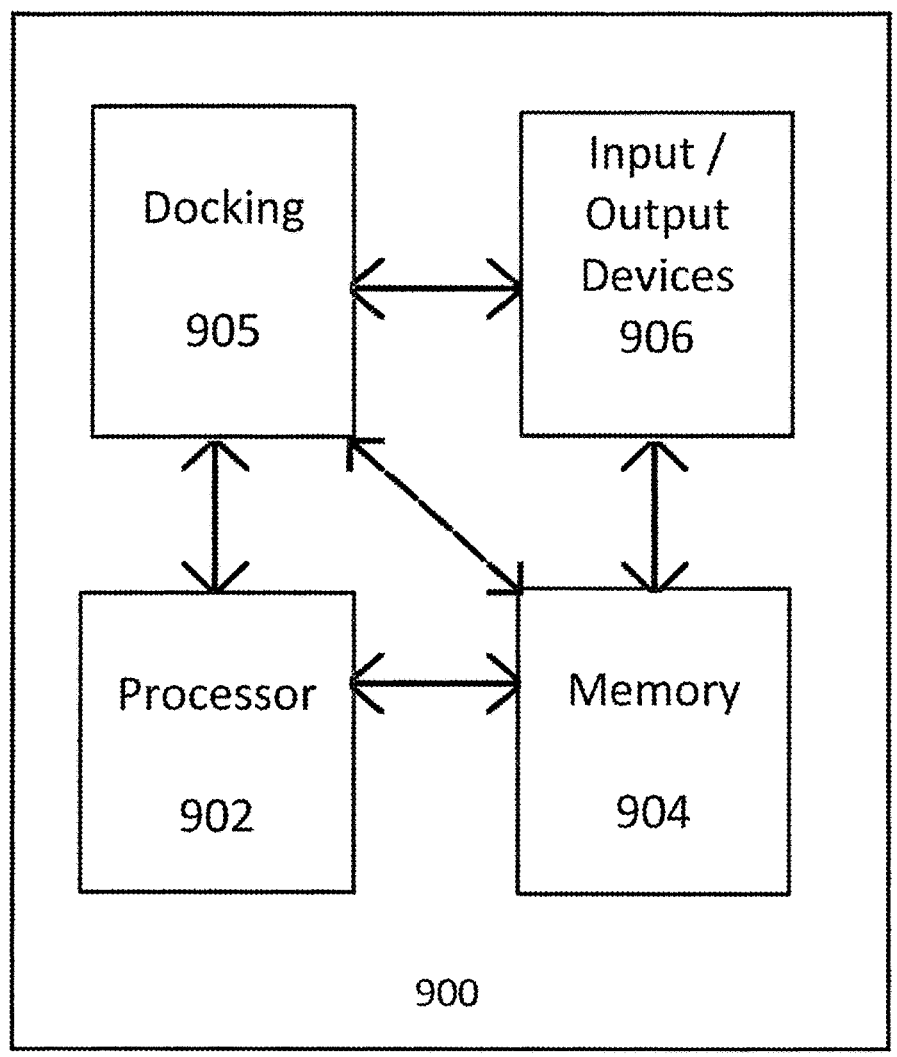
FIG. 9 is a high level block diagram of the present invention implemented using a general purpose computing device.

FIG. 9 is a high level block diagram of the present invention implemented using a general purpose computing device 900. In one embodiment, the general purpose computing device 900 is deployed onboard a watercraft and accessible and operable via a panel such as the panel 10 illustrated in FIG. 1. It should be understood that embodiments of the invention can be implemented as a physical device or subsystem that is coupled to a processor through a communication channel. Therefore, in one embodiment, a general purpose computing device 900 comprises a processor 902, a memory 904, a docking module 905, and various input/output (I/O) devices 906 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., docking module 905) can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Thus, in one embodiment, the docking module 905 for docking a watercraft described herein with reference to the preceding Figures can be stored on a computer readable medium.

Any combination of one or more computer readable medium(s) may be utilized. The computer readable medium may be a computer readable signal medium or a computer readable storage medium. A computer readable storage medium may be, for example, but not limited to, a non-transitory medium such as an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a solid state hard drive, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of programming languages include HTML5, Flash and other similar languages. Several processes may be used independently or in combination by or in connection with an instruction execution system, apparatus, or device.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The description of the present disclosure has been presented for purposes of illustration and description, but is not intended to be exhaustive or limited to the disclosure in the form disclosed. Many modifications and variations in techniques and structures, both now and in the future, will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

What is claimed is:

1. A system for securing a watercraft to a dock, the system comprising:
a first hardware sensor for automatically detecting a securing point to which to dock the watercraft;
a hollow extendable arm for mounting to the watercraft;
a cable housed inside the hollow extendable arm and having a proximal end secured to a reel, such that the cable is unwound from the reel by extension of the hollow extendable arm; and a grasping element mounted to a distal end of the cable and configured to engage the securing point, wherein the grasping element comprises:
- a first end connected to the distal end of the cable;
- a second end positioned opposite the first end;
- a bay defined between the first end and the second end;
- a rigid gate that is moveable between the first end and the second end to create a secure loop that reversibly locks the securing point within the bay;
- a first bore formed in the first end for housing the rigid gate;
- a second bore formed in the second end for reversibly engaging the rigid gate, wherein the rigid gate fully retracts into the first bore when the secure loop is not in use;
- a beam projection means installed in the grasping element for projecting a beam; and
- a second hardware sensor installed in the grasping element, wherein the second hardware sensor indicates, in response to detecting when the beam is broken, that an action should be initiated to move the rigid gate into the second bore.

2. The system of claim 1, wherein the system is configured for installation on the watercraft.

3. The system of claim 1, wherein the extendable arm comprises a plurality of concentric telescoping elements.

4. The system of claim 3, wherein the plurality of concentric telescoping elements are operated hydraulically, pneumatically, or electrically.

5. The system of claim 1, further comprising:
a tower for indirectly coupling the proximal end of the cable to the watercraft, wherein the tower comprises an interior space for housing components that control movement of the extendable arm.

6. The system of claim 5, wherein the tower is configured to be rotatably mounted to the watercraft.

7. The system of claim 1, further comprising a light source.

8. A method for securing a watercraft to a dock, the method comprising:
automatically detecting, by a first hardware sensor and a processor executing a set of cleat recognition instructions, a securing point on the dock;
extending a hollow extendable arm from the watercraft toward the securing point, wherein the hollow extendable arm houses a cable inside, wherein the cable has a proximal end secured to a reel, and wherein the extending includes unwinding the cable from the reel; and
engaging the securing point using a grasping element mounted to a distal end of the cable, wherein the grasping element comprises:
- a first end connected to the distal end of the cable;
- a second end positioned opposite the first end;
- a bay defined between the first end and the second end;
- a rigid gate that is moveable between the first end and the second end to create a secure loop that reversibly locks the securing point within the bay;
- a first bore formed in the first end for housing the rigid gate;
- a second bore formed in the second end for reversibly engaging the rigid gate, wherein the rigid gate fully retracts into the first bore when the secure loop is not in use;
- a beam projection means installed in the grasping element for projecting a beam; and
- a second hardware sensor installed in the grasping element, wherein the second hardware sensor monitors a state of the beam, and wherein the engaging comprises:
detecting that the beam has been broken; and
initiating an action that causes the rigid gate to move into the second bore.

9. The method of claim 8, further comprising:
automatically detecting, by a third hardware sensor, that lighting conditions on the dock are dark; and
automatically activating a light source mounted to the watercraft prior to the automatically detecting the securing point.

10. The method of claim 8, wherein the automatically detecting comprises:
scanning a plurality of objects on the dock for the securing point;
executing the set of cleat recognition instructions to identify those of the plurality of objects that are cleats and those of the plurality of objects that are not cleats; and
ignoring those of the plurality of objects that are not cleats.

11. The method of claim 8, wherein the engaging further comprises:
verifying that the securing point is locked within the bay;
retracting the hollow extendable arm, independently of the cable, to expose the cable; and
retracting the cable using an electric motor, thereby pulling the watercraft toward the dock.

12. The method of claim 11, further comprising:
monitoring a distance between the watercraft and the dock during the retracting, using a fourth hardware sensor and a processor executing a set of distance recognition instructions; and
automatically reducing a speed of the electric motor when the monitoring indicates an imminent collision.

13. The method of claim 8, wherein the extending comprises:
tracking a position of the securing point, using fifth hardware sensor and a processor executing a set of distance recognition instructions; and
guiding the arm toward the position indicated by the tracking.

14. A non-transitory computer readable storage medium containing an executable program for securing a watercraft to a dock, where the program performs steps of:
automatically detecting, by executing a set of cleat recognition instructions, a securing point on the dock;
extending a hollow extendable arm from the watercraft toward the securing point, wherein the hollow extendable arm houses a cable inside, wherein the cable has a proximal end secured to a reel, and wherein the extending includes unwinding the cable from the reel; and
engaging the securing point using a grasping element mounted to a distal end of the cable, wherein the grasping element comprises:
- a first end connected to the distal end of the cable;
- a second end positioned opposite the first end;
- a bay defined between the first end and the second end;
- a rigid gate that is moveable between the first end and the second end to create a secure loop that reversibly locks the securing point within the bay;

a first bore formed in the first end for housing the rigid gate;

a second bore formed in the second end for reversibly engaging the rigid gate, wherein the rigid gate fully retracts into the first bore when the secure loop is not in use;

a beam projection means installed in the grasping element for projecting a beam; and a second hardware sensor installed in the grasping element, wherein the second hardware sensor monitors a state of the beam, and wherein the engaging comprises:

detecting that the beam has been broken; and initiating an action that causes the rigid gate to move into the second bore.

15. The non-transitory computer readable storage medium of claim 14, wherein the engaging further comprises:

verifying that the securing point is locked within the bay;

retracting the hollow extendable arm, independently of the cable, to expose the cable; and retracting the cable using an electric motor, thereby pulling the watercraft toward the dock.

16. The non-transitory computer readable storage medium of claim 15, wherein the steps further comprise:

monitoring a distance between the watercraft and the dock during the retracting, by executing a set of distance recognition instructions; and automatically reducing a speed of the electric motor when the monitoring indicates an imminent collision.

17. The non-transitory computer readable storage medium of claim 14, wherein the extending comprises:

tracking a position of the securing point, by executing a set of distance recognition instructions; and guiding the arm toward the position indicated by the tracking.

18. The non-transitory computer readable storage medium of claim 14, wherein the automatically detecting comprises:

scanning a plurality of objects on the dock for the securing point;

executing the set of cleat recognition instructions to identify those of the plurality of objects that are cleats and those of the plurality of objects that are not cleats; and ignoring those of the plurality of objects that are not cleats.

* * * * *

UNITED STATES PATENT AND TRADEMARK OFFICE
CERTIFICATE OF CORRECTION

PATENT NO.         : 10,053,193 B2
APPLICATION NO.    : 14/654716
DATED              : August 21, 2018
INVENTOR(S)        : Ira Nachem It is certified that error appears in the above-identified patent and that said Letters Patent is hereby corrected as shown below:

In the Specification

Column 14, Line 65: Delete "421" and insert --42)--, therefor.

In the Claims

Claim 12, Column 20, Line 36: Delete "fourth" and insert --third--, therefor.

Claim 13, Column 20, Line 43: Delete "fifth" and insert --third--, therefor.

Signed and Sealed this
Nineteenth Day of March, 2019

Andrei Iancu
*Director of the United States Patent and Trademark Office*